UNITED STATES PATENT OFFICE 1,936,722

ARYLAMINO-2-HYDROXY-NAPHTHALENE-3-CARBOXYLIC ACIDS

Leopold Laska and Oskar Haller, Offenbach-on-the-Main, Germany, assignors to General Aniline Works, Inc., New York, N. Y., a corporation of Delaware No Drawing. Application January 11, 1932, Serial No. 586,066, and in Germany January 24, 1931

4 Claims. (Cl. 260—109)

Our present invention relates to arylamino-2-hydroxy-naphthalene-3-carboxylic acids.

These new compounds correspond to the general formula

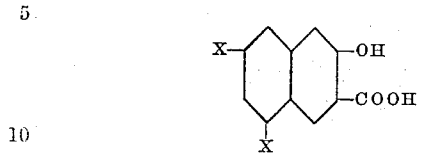

wherein one X is hydrogen, the other an arylamino group of the benzene or naphthalene series. They are obtained by heating to a temperature of above 200° C. an alkali metal salt of a 5- or 7-arylamino-2-hydroxy-naphthalene with carbon dioxide at a pressure of above 50 atmospheres, advantageously at 80 to 120 atmospheres.

These compounds exhibit intense colorations when their alcoholic solution is mixed with a diluted solution of ferric chloride and they combine with a diazo compound without elimination of the carboxylic acid group. By reason of these properties the carboxylic acid group is assumed to have entered the 3-position.

In order to further illustrate our invention the following examples are given, the parts being by weight and all temperatures in centigrade degrees, but we wish it however to be understood that we are not limited to the particular products or reaction conditions mentioned therein:

Example 1

2350 parts of 7-phenylamino-2-hydroxy-naphthalene are dissolved in 560 parts of caustic potash and 5000 parts of water in an autoclave provided with a stirrer and the water is distilled off, finally in vacuo, until the mass becomes entirely dry. Into the cold reaction mass carbon dioxide is introduced until a pressure of 50 atmospheres is attained and the whole is heated to 230–250° for 10 hours. The cold mass is dissolved in hot water. From the filtered solution the 7-phenylamino-2-hydroxy-naphthalene-3-carboxylic acid is precipitated by means of hydrochloric acid. For further purification it is dissolved in sodium acetate solution and again precipitated therefrom with an acid. When recrystallized from xylene or chlorobenzene it represents lemon yellow crystals melting at 230°. It corresponds to the formula:

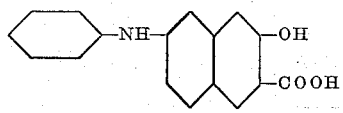

The alcoholic solution of this acid yields a dark blue coloration after the addition of a dilute solution of ferric chloride.

By starting with the sodium salt of 7-phenylamino-2-hydroxy-naphthalene the process may likewise be carried out.

Example 2

249 parts of 7(2'-methyl-phenylamino)-2-hydroxy-naphthalene are dissolved in 56 parts of caustic potash and 1000 parts of water in an autoclave provided with a stirrer and the water is distilled off, finally in vacuo, until the mass becomes entirely dry. Into the cold reaction mass carbon dioxide is introduced until a pressure of 90 atmospheres is attained and the whole is heated to 210–220° for 12 hours. The cold mass is worked up as described in Example 1. The new 7(2'-methyl-phenylamino)-2-hydroxy-naphthalene-3-carboxylic acid corresponds to the formula:

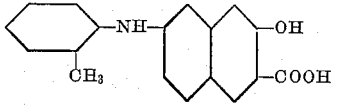

When recrystallized from chlorobenzene it represents yellow crystals melting at 250°. The alcoholic solution of this acid yields a blue coloration after the addition of a dilute solution of ferric chloride.

Example 3

269 parts of 7(4'-chloro-phenylamino)-2-hydroxy-naphthalene are dissolved in 50 parts of caustic potash and 1000 parts of water in an autoclave provided with a stirrer and the water is distilled off, finally in vacuo, until the mass becomes entirely dry. Into the cold reaction mass carbon dioxide is introduced until a pressure of 90 atmospheres is attained and the whole is heated to 230° for 12 hours. The cold mass is worked up as described in Example 1. The new yellow 7(4'-chloro-phenylamino)-2-hydroxy-naphthalene-3-carboxylic acid correponds to the formula:

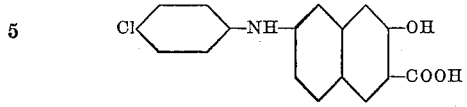

It melts when dissolved in sodium acetate solution and again precipitated therefrom with an acid, at 255°. The alcoholic solution of this acid yields a blue coloration after the addition of a dilute solution of ferric chloride.

The following table shows the properties of some other carboxylic acids prepared in an analogous manner:

| 2-hydroxy-naphthalene-3-carboxylic acid substituted by | Color | Recrystallized from | Melting point | Tint when mixed with ferric chloride |
|---|---|---|---|---|
| 7(4'methoxy-phenylamino). | Yellow | Chlorobenzene | 240° | Bluish black. |
| 7(4'-methyl-phenylamino). | Yellow | o-dichlorobenzene. | 245° with decomposition. | Dark blue. |
| 7-(α-naphthylamino). | Brownish yellow. | Precipitated from sodium acetate solution. | 272° | Bluish green. |
| 5-phenylamino | Orange-yellow. | Trichlorobenzene. | 214°-215° | Green. |

We claim:

1. The arylamino-2-hydroxy-naphthalene-3-carboxylic acids of the general formula

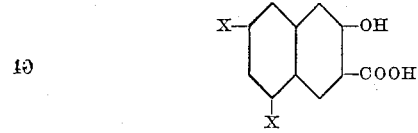

wherein one X is hydrogen, the other X an arylamino group of the benzene or naphthalene series, which compounds are soluble in alkalies, combine with diazo compounds without elimination of the carboxylic acid group and exhibit intense colorations when their alcoholic solution is mixed with a diluted solution of ferric chloride.

2. The 7-phenylamino-2-hydroxy-napthalene-3-carboxylic acid of the following formula:

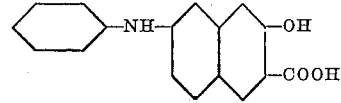

which compound melts when recrystallized from xylene or chlorobenzene at 230°, is soluble in alkalies and exhibits a dark blue coloration when its alcoholic solution is mixed with a diluted solution of ferric chloride.

3. The 7(4'-methyl-phenylamino)-2-hydroxy-naphthalene-3-carboxylic acid of the following formula:

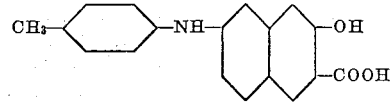

which compound melts when recrystallized from ortho-dichloro-benzene at 245° with decomposition, is soluble in alkalies and exhibits a dark blue coloration when its alcoholic solution is mixed with a diluted solution of ferric chloride.

4. The 5-phenylamino-2-hydroxy-naphthalene-3-carboxylic acid of the following formula:

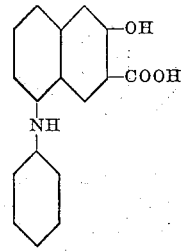

which compound melts when recrystallized from trichlorobenzene at 214°-215°, is soluble in alkalies and exhibits a green coloration when its alcoholic solution is mixed with a diluted solution of ferric chloride.

LEOPOLD LASKA.
OSKAR HALLER.